April 18, 1961 M. MRVOSH, JR 2,980,070
HIGH-SPEED PNEUMATIC POWER CYLINDERS
Filed May 13, 1959
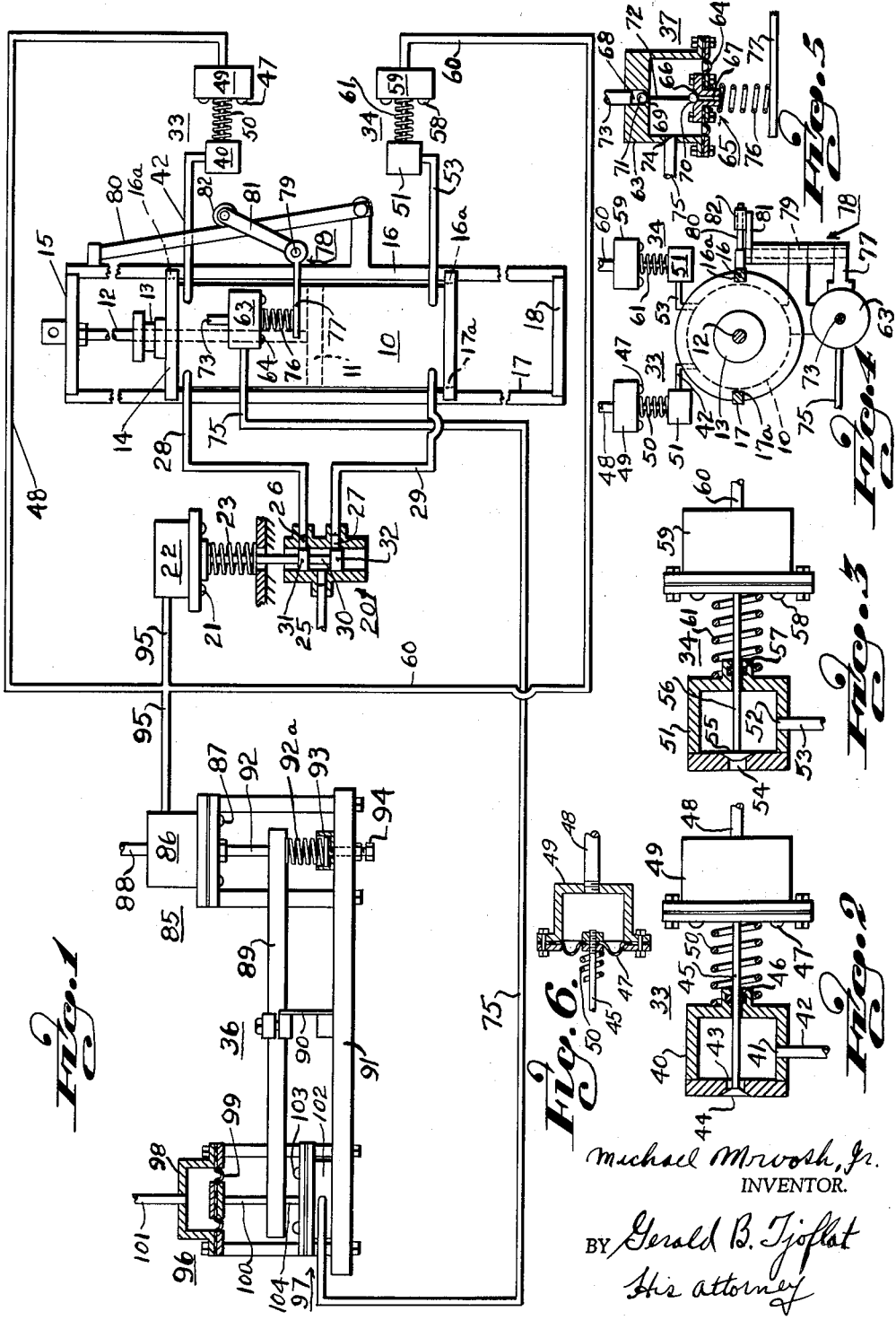
Michael Mrvosh, Jr.
INVENTOR.
BY Gerald B. Tjoflat
His attorney

United States Patent Office 2,980,070
Patented Apr. 18, 1961

2,980,070

HIGH-SPEED PNEUMATIC POWER CYLINDERS

Michael Mrvosh, Jr., Whitehall, Pa., assignor to Hagan Chemicals & Controls, Inc., Pittsburgh, Pa., a corporation of Pennsylvania Filed May 13, 1959, Ser. No. 812,960

6 Claims. (Cl. 121—41)

This invention relates to power cylinders and particularly power cylinders of the pneumatic type whose operations are controlled by pilot valves actuated by signal responsive control means.

Pneumatic power cylinders are, as a rule, easily controlled as to the direction and extent of movement of the piston. However, when relatively long and relatively high speed strokes of the piston are required, the air on the low pressure side of the piston cannot be exhausted fast enough through the pilot valve to obtain the relatively long high speed stroke of the piston which is required by the magnitude of the signal. In such cases, the air on the exhaust side of the piston is compressed and thereby reduces the driving pressure differential across the piston and the power available for moving it.

For relatively short and slow speed strokes, the pilot valve is capable of exhausting the air from the end of the cylinder towards which the piston is traveling, to provide satisfactory response and rate of motion of the piston.

An object of this invention is to provide a double-acting pneumatic power cylinder with a signal controlled pilot valve and quick opening, relatively large capacity unloading valves at the ends of the cylinder which are so designed that one of them opens when the control signal exceeds a set point value by a predetermined amount, while the other opens when the control signal is less than the set point signal by a predetermined amount.

Another object is to provide a means for generating a pilot valve signal that is a function of a set point force, an input signal force and a force that is a function of the position of the piston in the power cylinder, and in which the unloading valves are controlled from the pilot valve control signal and disposed to open at predetermined values, plus or minus the pilot valve set point signal.

The foregoing and other objects of the invention will be apparent to those of ordinary skill in the art to which the invention pertains from the following description taken in conjunction with the accompanying drawings.

In the drawings:

Figure 1 is a more or less diagrammatic view, partly in section, of a pneumatic power cylinder having a control signal actuated pilot valve, quick unloading valves for each end of the cylinder and a control means for generating the pilot valve signal as a function of the piston position, a set point signal and a variable signal, one of the unloading valves being operated at the set point signal plus a predetermined value and the other at the set point signal minus a predetermined value;

Figs. 2 and 3 are views, partly in section, of unloading valves that operate respectively at the pilot valve set point signal, plus or minus a predetermined value;

Fig. 4 is a top-plan view of the power cylinder showing the unloading valves and other components of Fig. 1; and Fig. 5 is a more or less schematic view of a diaphragm actuated valve embodied in two of the components of Fig. 1.

Figure 6 is a more or less schematic sectional view of the diaphragms embodied in the pilot valve signal pressure operated valves.

In the drawings, a power cylinder 10, of the pneumatic type, is shown. It is provided with a piston 11 having a piston rod 12 extending from one face thereof through a stuffing box 13 in the upper cylinder head 14. The upper end of the rod 12 carries a crosshead 15 from which side rods 16 and 17 depend. These rods are guided in suitable slots 16a, and 17a in the upper and lower cylinder heads, respectively, as shown, and are connected at their lower ends by a crosshead 18. Either of the crossheads 15 and 18 may be attached to the load or object to be positioned by the piston of the power cylinder.

The direction of motion of the piston 11 is controlled by a pilot valve 20 that is actuated by a pressure signal responsive means, such as a diaphragm 21, disposed in a signal receiving housing 22.

The diaphragm 21 is urged in one direction by a compression spring 23 and in the other by signal pressure acting on the diaphragm.

Valve 20 comprises a body 24 having a pressure supply port 25, to which pressure at constant value is supplied, and outlet ports 26 and 27 connected to the opposite ends of the cylinder 10 by pipes 28 and 29, respectively. The outlet ports of body 24 are controlled by a valve 30 having lands 31 and 32 spaced to close the outlet ports when the valve is in its mid or neutral position. The supply port 25 being between the outlet ports, pressure is admitted through pipe 29 to the lower end of the cylinder 10 when valve 30 is moved below mid position, whilst the upper end of the cylinder is connected to atmosphere through the pipe 28 and port 26. When valve 30 is actuated to a position above mid or neutral position, supply pressure is admitted through pipe 28 to the upper end of the cylinder 10 through port 26, whilst the lower end is connected to exhaust to the atmosphere through pipe 29 and port 27.

When the supply pressure to either end of the cylinder 10 is such as to require a relatively short and a relatively slow speed stroke of the piston 11, the rate of exhaust through the pilot valve is adequate. But, when the pilot valve 30 is moved to a position that provides a higher pressure and a higher volume of motivating air on one side of the piston and thereby calling for a high speed stroke or motion of the piston, the rate of exhaust of air from the opposite side of the piston is too low; consequently, the back pressure decreases the power available for moving the piston at the rate required.

In order to decrease the back pressure above mentioned, when a fast piston stroke is required, relatively high capacity unloading valves 33 and 34 are provided and connected to the opposite ends of the cylinder 10 as shown.

The arrangement of the connections from valve 20 to cylinder 10 are such that when the signals in housing 22 increase from the reference or set point value, the piston moves upwardly. The piston moves downwardly when the signal decreases below the reference or set point value.

The valves 33 and 34 are diaphragm-actuated and spring-biased and so arranged that valve 33 opens when the signal to housing 22 of valve 20 increases to a predetermined value above the set point value, while valve 34 opens when the signal in housing 22 has decreased a predetermined amount below the set point signal. Thus, for example, if it be assumed that the reference or set point signal is 15 p.s.i.g., valve 33 opens at 15 p.s.i.g. + $X$ p.s.i.g. If the value of $X$ is, for example, 2 p.s.i.g., then valve 33 opens at 17 p.s.i.g. Similarly, if the signal to housing 22 decreases (X) p.s.i.g. below the reference signal, valve 34 opens at 15 p.s.i.g.—(X) p.s.i.g. In the case the value of (X) is 2 p.s.i.g., valve 34 will open at 13 p.s.i.g. of signal.

The reason for opening valve 33 at (15+X) p.s.i.g. and valve 34 at (15−X) p.s.i.g., is that when the pilot valve signal has changed that much, a faster and a longer stroke of the piston 11 is required in the direction called for by the signal.

Valves 33 and 34 are actuated by the same signal that is supplied to the pilot valve diaphragm 21 in housing 22.

The actuating signals for the pilot valve 20 and the unloading valves 33 and 34 are provided by a ratio relay 36 and a valve mechanism 37 that develops a signal that is proportional to the position of the piston 11 with respect to its mid position. The ratio relay 36 responds to an input control signal whose value varies in accordance with changes in a variable under the control of the piston of power cylinder 10.

Ratio relay 36 is biased to generate the reference signal for the pilot valve housing 22. It responds to an input signal and if that signal is increasing from the set point, the relay transmits an increased signal to the pilot valve whereupon the piston 11 moves upwardly. As it moves upwardly, valve mechanism 37 develops an increasing pressure and when that piston position signal balances the input signal to relay 36, the output signal of that relay will have been restored to the reference value of 15 p.s.i.g. Likewise, decreasing values of the variable signal input to relay 36 causes that relay to decrease the pilot valve signal to a value below the set point signal of 15 p.s.i.g., thereby causing the piston 11 to move downwardly. As it moves downwardly, the position valve mechanism 37 decreases its position signal to relay 36 and when that signal balances the condition input signal, the relay signal to the pilot valve operating diaphragm 21 will have been restored to the mid or set point signal.

When the signal to the diaphragm 21 increases to the assumed value of 17 p.s.i.g., valve 33 opens, allowing piston 11 to move at a high rate of speed in the up direction. Similarly, when the signal falls to 13 p.s.i.g., the piston moves at a high rate of speed in the opposite or down direction.

In the foregoing, the description of the power cylinder has been such as to indicate that the power cylinder is mounted in a vertical position. It is to be understood that it may be mounted in a horizontal position or at an angle to the horizontal. For that reason, the terms "upwardly" or "downwardly," as used in the description of the power cylinder and the pilot valve, may also have reference to other mounting positions.

The illustrated construction and function of the valves 33 and 34, the position signal valve mechanism 37, and the ratio relay, are described in the following.

*Valve 33*

Valve 33 comprises a body 40 having an inlet port 41 connected by a pipe 42 to the upper end of cylinder 10, and an exhaust port 43 controlled by a valve 44. Valve 44 is connected by a stem 45 leading through a seal 46 to a diaphragm 47 to which it is connected. The diaphragm 47 is subjected to the pilot valve signal pressure which is communicated by a pipe 48 to the housing 49 of diaphragm 47. A compression spring 50 seats the valve 44 in closed position. The force of spring 50 is such that a pressure of 17 p.s.i.g. on the diaphragm 47 is required to open valve 44. The area of diaphragm 47 is such that the force developed by it exceeds the spring force at that pressure. Valve 44 is open at the same time that the pilot valve 20 is connected to the atmosphere. Thus, the upper end of cylinder 10 has two exhaust ways at 17 p.s.i.g. or higher of signal pressure.

*Valve 34*

Valve 34 is similar to valve 33 but differs in the arrangement of the exhaust valve. Valve 34 comprises a body 51 having an inlet port 52 connected by a pipe 53 to the lower end of the cylinder 10, and an exhaust port 54 controlled by a valve 55. The valve 55 is connected by a stem 56 extending out of the body 51 through a seal 57, to a diaphragm 58 in a housing 59 to which the pilot valve signal pressure is supplied by a pipe 60. Valve 55 is biased towards open position by a spring 61. The force developed by diaphragm 59 at signal pressures above 13 p.s.i.g. is sufficient to hold valve 55 on the seat of the exhaust port 54 as that force is greater than the force of spring 61. As soon as the force of diaphragm 58 developed by the signal pressure falls below the force of spring 61, valve 55 opens. The valve closes as soon as the signal pressure increases to a value above 13 p.s.i.g. Thus, at 13 p.s.i.g. or less of pilot valve signal pressure, the lower end of cylinder 10 has two exhaust ways, one through the pilot valve port 27 and the other through the valve port 54.

PISTON POSITION SIGNAL

*Mechanism 37*

Mechanism 37 comprises a housing 63 having a flexible diaphragm 64 at one end. The central portion of the diaphragm includes an exhaust port assembly 65 having an exhaust seat 66 connected by a way 67 to the atmosphere. The body is provided with an inlet port 68 having a valve seat 69. The valve seats 66 and 69 are controlled by valve elements 70 and 71 carried by a stem 72. A source of supply pressure at constant value is connected to port 68 by a pipe 73. The body or housing 63 has an outlet port 74 connected by a pipe 75 that transmits the position signal to the ratio relay 36.

The diaphragm 64 is urged by pressure in housing 63 in such a direction as to unseat valve 70 from the exhaust port seat 66 and it is urged in the opposite direction by a compression spring 76 and an arm 77 of a bell crank 78, to unseat valve 71 from the inlet port seat 69 to admit pressure to the housing 63. When the spring force and the diaphragm force, resulting from the pressure on the diaphragm, are in balance, both the inlet and the exhaust ports are closed.

The bell crank 78 is mounted on a pivot 79 at the knee thereof, and it is actuated by a cam bar 80 secured to one of the side rods, for example, side rod 16, at an appropriate but adjustable angle thereto. As shown, arm 81 of the bell crank has a roller 82 that rides on the cam bar. When the piston 11 travels upwardly, carrying the crosshead 15 and the side rods 16 and 17 as previously described the bell crank 78 turns clockwise as the cam roller 82 follows cam bar 80 and exerts a force through the spring 76 against the diaphragm. That force unseats the inlet port 69 whereby the pressure in the housing 63 is increased until the pressure force developed by the pressure on the diaphragm balances the spring force. When the piston 11 moves downwardly, bell crank 78 turns counterclockwise thereby decreasing the spring force and as the force of pressure on the diaphragm is the greater, the diaphragm moves downwardly to uncover the exhaust port 66 and reduce the pressure until the force of pressure balances the spring force. At that time, both valve ports are closed.

Thus, for every position of piston 11, a definite and corresponding value of position signal is transmitted through pipe 75 to the ratio relay 36. The position signal opposes the input signal to the relay 36 and in that way partially determines the signal delivered to the pilot valve diaphragm housing 22.

*Ratio relay 36*

Ratio relay 36 comprises a diaphragm valve assembly 85, which, for the purposes of this case, may be assumed to be of the same construction as the diaphragm valve assembly shown in Fig. 5. That assembly includes a housing 86 supported as shown and having a diaphragm 87 provided with an exhaust valve assembly like that shown at 65 (Fig. 5), a supply pressure pipe 88 leading to the inlet port and a valve stem and valve elements that control the inlet and exhaust ports in the same manner as the inlet and exhaust ports of the device of Fig. 5 are controlled.

Relay 36 includes a beam 89 mounted on a frictionless fulcrum 90 secured to a base 91. Diaphragm 87 is provided with a push rod 92 that engages one end of beam 89 and transmits the diaphragm force to the beam. That force is opposed by a set point means such as a spring 92a, one end of which is seated in an adjustment 93 having a screw 94 threaded into the base. By that adjustment means, the reference signal, delivered by the signal output pipe 95 to the housing 22 and to the exhaust valve housings 49 and 59, may be adjusted to any required set point value. The set point value is dependent upon the force exerted upwardly against the diaphragm because the diaphragm must develop a pressure that balances the force of the spring.

Relay 36 includes a signal receiver 96 and a position signal receiver 97.

Receiver 96 comprises a housing 98 mounted on the base 91, as shown, and having a diaphragm 99 provided with a stem 100 that engages beam 89 at the left-hand end thereof. Housing 98 receives from a pipe 101 the input signals that vary in magnitude with a condition to be controlled by control means positioned by the piston 11 of the power cylinder, to correct deviations in a controlled factor from a desired value. The forces developed by diaphragm 99 urge the beam 89 in a counterclockwise direction about the fulcrum 90. If that turning moment were unopposed by the receiver 97, the inlet port of the valve assembly would open to increase the pressure in the housing 86 and the signal pressure delivered to the pilot valve housing 22 and the diaphragm housings 49 and 50 of the quick opening exhaust valves 40 and 41, respectively. However, the input signal is opposed as stated by the piston position signal.

The piston position signal receiver 97 includes a housing 102 mounted to the base 91 and having a diaphragm 103 that exerts clockwise turning forces on beam 89 through a stem 104.

*Operation*

Increasing signals in housing 98 produce increasing signals in housing 86 and the signal pipe 95. Those signals cause piston 11 to move upwardly. As the piston travels upwardly, an increasing signal is transmitted to the receiver 97. When that signal balances the signal in housing 98, pilot valve 20 is in neutral position and piston 11 comes to rest. If now the input signal to the housing 98 decreases, the position signal in the receiver 97 will cause beam 89 to turn clockwise whereby pressure is exhausted from housing 86 and the signal to the pilot valve housing 22 is decreased. In response to that decrease in pressure, the pilot valve opens to admit pressure to the upper side of piston 11 causing it to move downwardly. The position signal means 37 therefore transmits a reduced signal to receiver 97. When that signal balances the input signal to housing 98, the output signal from housing 86 is restored to the set point value.

If the input signals rise to a point exceeding the reference signal to the pilot valve by, say, 2 p.s.i.g., exhaust valve 33 opens thereby decreasing the back pressure on piston 11 and allowing it to move at a high rate of speed to the position called for by the signal. In a similar manner, if the output signal of relay 36 decreases to, say 2 p.s.i.g. below the set point signal of 15 p.s.i.g., the exhaust valve 34 opens whereby the back pressure resisting downward movement of piston 11 is quickly relieved so that the piston may move at a high rate of speed to the position called for by the signal delivered by relay 36 to the pilot valve housing 22.

By adjusting the fulcrum 90 left or right from mid position, the ratio of the forces, and thus the ratio of pressures in housing 86 and the force of spring 92a, to the pressures in the housings 98 and 102 may be modified to suit the operating characteristics of the system as a whole.

Having thus described an illustrative embodiment of the invention, it will be apparent to those of ordinary skill in the art to which the invention pertains, that various modifications and changes may be made without departing from either the spirit or the scope of the invention.

Therefore, what is claimed as new and desired to be secured by Letters Patent is:

1. In combination, a pneumatically actuated power cylinder having a piston therein and a piston rod extending outwardly of the cylinder through an end thereof, a pilot valve arranged to supply motive pressure to either end of the cylinder while exhausting pressure from the other, pressure responsive means for actuating the pilot valve, means for supplying a set point signal to the pilot valve actuating means whereby to position the piston in a predetermined position, said piston moving in one direction as the signal to the pilot valve actuating means increases above and in the other direction as the signal decreases below said set point signal, unloading vents at each end of the cylinder and normally closed exhaust valves connected to the respective vents of said cylinder and being provided with actuating means responsive to the signal pressure for said pilot valve actuating means, one of said valves being spring-biased to closed position and actuated to open position when the pilot valve actuating means signal rises above the set point signal by a predetermined amount, the other of said valves being spring-biased to open position but held in closed position by the actuating means therefor until the signal pressure falls below the set point signal by a predetermined amount.

2. A combination as in claim 1 in which the operating signal pressure for the pilot valve actuating means is provided by a device which comprises a beam mounted on a fulcrum, a signal generating and force developing device connected to said beam at one side of the fulcrum so as to be actuated thereby to develop an output operating signal for the pilot valve actuating means and a force on the beam proportional to said pressure, means yieldingly connected to said beam and opposing and balancing the output signal force at the set point signal value, a variable signal input responsive means connected to the beam to exert a force on said beam on the opposite side of the fulcrum and urging the beam in a direction to increase the output signal to a value greater than the set point value, a piston position signal responsive means connected to said beam and disposed to balance the force on the beam developed by the variable input signal means, and means actuated in accordance with the position of the piston in the cylinder for developing an increasing signal as the piston moves in the one direction called for by increasing pilot valve actuating signals and a decreasing signal when the piston moves in the opposite direction, the operating signal pressure being restored to the set point value when the piston position signal and the variable input signal are in balance.

3. In combination, a pneumatic power cylinder having a piston and a piston rod, a diaphragm operated pilot valve for admitting operating pressure to either side of the piston and exhausting pressure from the other, means for supplying an operating signal to the diaphragm of the valve, the valve being in mid position when the magnitude of the operating pressure to the diaphragm is at a predetermined value, said pilot valve being actuated to admit operating pressure to one end of the cylinder when the operating pressure exceeds the set point value and exhausting pressure from the other end, a first means responsive to diaphragm operating pressure for exhausting the end of the cylinder towards which the piston moves when the operating pressure exceeds the set point pressure by a predetermined amount and the piston moves in one direction, and a second means responsive to the diaphragm signal pressure for exhausting the other end of the cylinder when the piston moves in the opposite direction towards the same in response to the diaphragm operating pressure decreasing a predetermined amount below the set point pressure.

4. A combination as in claim 1 in which the valve that opens at a pressure above the set point value comprises a body having an inlet port connected to the cylinder, an exhaust port, a valve, yielding means urging the valve to closed position on the exhaust port and a pressure responsive force producing means for opening the valve, the force of the yielding means being greater than the force of the pressure responsive means until the pilot valve signal exceeds the set point signal by a predetermined amount, and in which the other valve is provided with a body having an inlet port connected to the opposite end of the cylinder, an exhaust valve port, a valve, yielding means urging the valve towards open position with respect to said port and signal pressure responsive force producing means disposed to hold the valve in closed position on said port until the pilot valve signal decreases a predetermined amount below the set point signal.

5. A combination as in claim 2 in which the valve that opens at a pressure above the set point value comprises a body having an inlet port connected to the cylinder, an exhaust port, a valve, yielding means urging the valve to closed position on the exhaust port and a pressure responsive force producing means for opening the valve, the force of the yielding means being greater than the force of the pressure responsive means until the pilot valve signal reaches a first condition in which it exceeds the set point signal by a predetermined amount, and in which the other valve is provided with a body having an inlet port connected to the opposite end of the cylinder, an exhaust valve port, a valve, yielding means urging the valve towards open position with respect to said port and signal pressure responsive force producing means disposed to hold the valve in closed position on said port until the pilot valve signal reaches a second condition in which it decreases a predetermined amount below the set point signal.

6. A combination as in claim 3 in which the means for exhausting the respective ends of the cylinder at pilot valve actuating pressures above and below said predetermined value, comprise exhaust valves each of which is provided with a diaphragm operator, one of said valves being biased to closed position by a yielding means and opened by its diaphragm operator when the pilot valve diaphragm actuating pressure reaches a first condition in which it exceeds by a predetermined amount the mid point pressure therefor, and the other of which is biased to open position and held in closed position by its diaphragm operator until the pilot valve operating signal reaches a second condition in which it decreases by a predetermined amount from the mid point of said pilot valve actuating pressure.

References Cited in the file of this patent

UNITED STATES PATENTS

| | | |
|---|---|---|
| 2,020,847 | Mitereff | Nov. 12, 1935 |
| 2,385,351 | Davidsen | Sept. 25, 1945 |
| 2,507,498 | Brown | May 16, 1950 |
| 2,637,301 | Burdick | May 5, 1953 |